May 22, 1928.

F. C. CARPENTER

ANTISKID CHAIN

Filed Dec. 31, 1925

1,670,528

Witness:

Inventor
Forrest C. Carpenter
By Ernest E. Dupes
Atty

Patented May 22, 1928.

1,670,528

UNITED STATES PATENT OFFICE.

FORREST C. CARPENTER, OF CHICAGO, ILLINOIS.

ANTISKID CHAIN.

Application filed December 31, 1925. Serial No. 78,514.

My invention relates to improvements in anti-skidding devices for use with vehicle tires and has for one of its objects the provision of means adapted for easy removal and interchangeability of portions of the cross chains forming part of the device.

Another object is to provide a device of the class described having cross chains comprising a plurality of parts and means for easy reversal or removal of the parts whereby the wear upon such cross chains can be equalized by turning such parts end for end.

A further object of the invention is to provide a device of the class described having cross chains intersecting at the tread of the tire and connected by a member providing means which permits engagement and disengagement between the intersecting cross chains when the device is in inoperative position and which prevents such engagement and disengagement when the device is in operative position.

A still further object of the invention is to provide a device of the class described having two part cross chains diagonally disposed over the tire tread which intersect at the center of the tread with other cross chains and are connected at their intersection by means which has a plurality of projections adapted to positively engage the roadway surface and prevent undue skidding of the tire over the surface of the roadway.

Another object is to provide a device of the class described having cross chain units made up of a plurality of interchangeable, reversibly-mounted, detachable segments so arranged that in the event one of such segments becomes broken or accidentally detached, the remaining segments of the unit are so arranged and constructed as to effectually function to prevent skidding.

Another object is to provide a device having cross chains intersecting and connected so that the stresses set up by their resistance to skidding are substantially direct tensile stresses and not transverse bending stresses.

A still further object is to provide a chain of the class described which will tend to prevent skidding equally as well laterally as longitudinally of the direction of travel.

Still another object is to generally improve chains of the class described.

With the above and other objects in view, the invention consists in the typical details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views, and in which.

Figure 1:
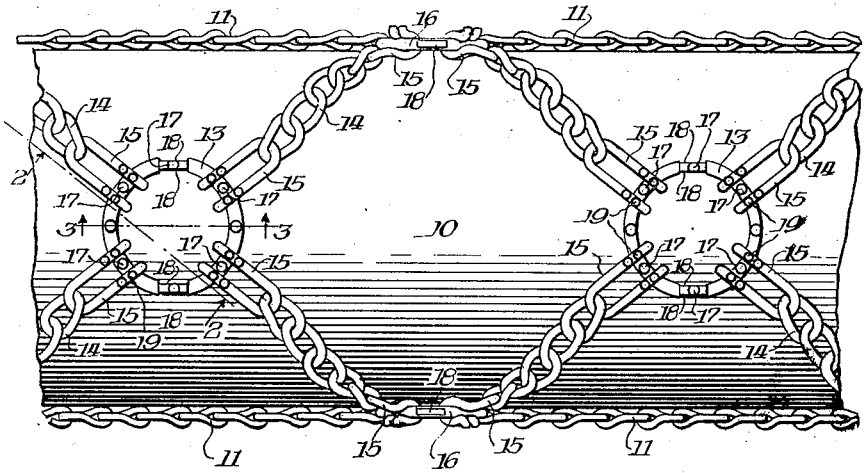
Fig. 1, is a segment of a tire associated with an illustrative form of chain.
Figure 2:
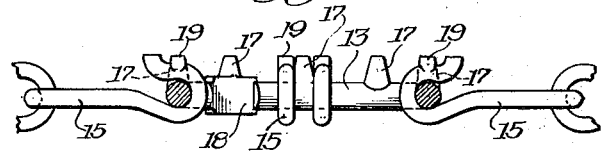
Fig. 2, is an enlarged section on the line 2—2 of Fig. 1.
Figure 3:
Fig. 3, is an enlarged section on the line 3—3 of Fig. 1.

Referring to Fig. 1, the invention will be described as applied to a pneumatic tire, 10, only a portion of which being necessarily disclosed for this purpose.

A pair of peripheral rim chains, 11, extend around the edges of the tire in the usual manner and are connected preferably at regular intervals by a pair of intersecting, two-part, cross chains, 14. A connecting element, 13, preferably taking the form of a ring, as shown, and positioned at the junction of the intersecting chains, 14, serves as a means for connection for the two-part chains of each intersecting cross chain. Each part of the cross chain, 14, has a hook, 15, detachably mounted on each end. The side chains, 11, are provided at intervals with connecting rings, 16, to which the outer ends of the cross chains are fastened by the hooks, 15, in a manner to be hereinafter more particularly described. The intersecting ends of the cross chains are likewise connected to the ring, 13, in a similar manner. The spacing of the rings, 16, in the chain, 11 is preferably made such that the cross chains intersect at an angle of substantially ninety degrees.

The two parts of the cross chain, 14, being identical and having a hook 15, on each end, can be interchanged or the ends reversed for the purpose of equalizing the wear. They can, likewise, be replaced by or interchanged with any other cross chain, 14, when the chain is in inoperative position.

The hooks, 15, are equally well adapted for engagement with the central ring, 13, or with the rings, 16, which form a portion of the rim chains, 11. Provision is made for easy attachment of the cross chain, 14, to the ring, 16, when the cross chain is in inoperative position and for preventing its accidental detachment while in this position. Likewise, provision is made for preventing either accidental or intentional disengagement of the cross chain 14, from the ring, 16, when the chain is in its operative position. For this purpose the rings, 16, are each provided with a pair of lugs, 17, and the axial diameter of the cross section of the ring is diminished by the grooves 18, at a portion substantially midway between the lugs. The cross section of the rings at the grooves 18, is maintained substantially equal to the circular cross section by making the ring deeper at the grooves and thereby forming an elongated cross section.

Figure 4:
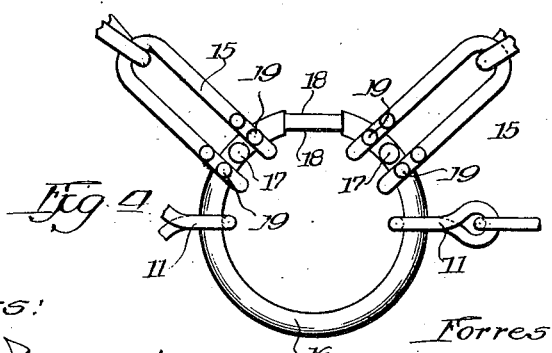
Fig. 4, is an enlarged detail of the means provided for fastening the diagonally extending cross chains to the peripheral rim chains.

In Fig. 4, the hooks, 15 are shown in position upon the ring, 16, with the lugs, 17 between the arms of the hook, the lugs thereby serving as a stop to prevent movement of the hooks circumferentially around the ring. The hooks, 15 are generally U-shaped with the free ends of the arms turned back to loosely fit and partially encircle the ring, 16. The turn back of the arms of the hook, 15, is slightly more than 180 degrees, thereby making the space between the free ends of the arms and the body of the hook less than the diameter of the circular solid ring portion and greater than the small dimension of the elongated cross section at the grooves, 18, and also greater than the maximum diameter of the lugs. The hook, 15, can be mounted upon the ring, 16, only by turning the hook so that it is substantially parallel with the axis of the ring and then inserting the grooved portion of the ring between the free ends and the arms of the hook. The hook is then moved circumferentially around the ring until the lug, 17, is positioned between the two free ends of the hook where it is then rotated to its operative position best indicated in Fig. 4. Removal of the ring from the hook is accomplished by the reverse process, and since the hook can be removed only when in the position described, there is no possibility of its becoming detached when the cross chain is in its operative position, and practically impossible that it will become displaced accidentally when the chain is in inoperative position.

The rings, 13, are preferably of the same cross sectional diameter as the rings, 16, but of larger main diameter. Each of the rings, 13, are provided with two pairs of grooves, 18, identical with the grooves on the rings, 16, the two pairs being oppositely disposed as indicated in Fig. 1. The ring, 13, is provided with a plurality of lugs, 17, preferably eight in number, arranged so that there is one between the arms of each of the four hooks, 15, attached thereto and four substantially midway between the hooks when in their inoperative position. Two of the latter are at the respective elongated cross sectional portions formed by the grooves, 18. By this arrangement of the grooves, 18, any one of the hooks, 15, can be removed by only a small movement circumferentially of the ring, and the arrangement of the lugs, prevents accidental disengagement of the hooks in either operative or inoperative position.

The lugs, 17, which are positioned upon the rings, 13, serve as a stop or holding device which keeps the hooks, 15 in their proper relative circumferential position upon the rings. The lugs are preferably of the general shape of the frustrum of a cone with the small end tapered to a point and are high enough to project above the hooks, 15. In inoperative position of the device, they positively engage and indent the roadway surface and thereby increase the antiskidding efficiency of the cross chains. They also minimize the abrasion upon the body of the rings, 13, and protect the cross chains from excessive wear.

The free ends of the hook, 15, are turned out at their tips sufficiently to be substantially flush with the tips of the lugs, 17. A lug, 19, is placed upon each arm of the hook in such position as to be immediately over the body portion of the ring, 13. The lugs, 17 and 19, and the projecting free ends of the hooks, 15, combine to form a means which engages the roadway surface positively and functions as a device tending to prevent skidding in any direction along the roadway.

In the event either section of the two-part cross chains, 14, becomes broken, it can easily be removed by disengagement from the ring, 16, with the device in its operative position. The two intersecting cross chains comprise units of four connected chain portions which will continue to function temporarily as tension members resisting any tendency to skid even though one of the four portions is removed. The missing portion can be replaced when it is convenient to do so and when the intersecting ends of the cross chains appear worn, they can be reversed and the life of the device thereby prolonged. By arranging the chains diagonally, they take the strains directly in tension and not in bending as is the case where the cross chains run transversely. Severe strains are thereby avoided and smaller chains can be used than would otherwise be practicable. This economy is further augmented by the lugs on the central rings taking the brunt of the shock caused by contact with a hard road surface.

It is thought that the operation and utility of the device will be apparent without further description, and while in the drawings there is illustrated a preferred embodiment of the invention, it is to be understood that the structural elements are susceptible to such variations and modifications as fall within the scope of the appended claims.

I claim:

1. Means for connecting the adjacent ends of a plurality of cross chains of an anti-skid device together, said means comprising a ring having lugs formed at diametrically opposite points and a substantially U-shaped connecting element connecting each of said cross chains with one of the portions of the ring having a lug thereon, said U-shaped elements each terminating to provide hooks one on either side of the lug for the purpose described.

2. Means for connecting the adjacent ends of a plurality of cross chains of an anti-skid device together said means comprising a ring having lugs formed at diametrically opposite points and extending parallel to the axis of the ring, and a substantially U-shaped element connecting each of said cross chains with one of the portions of the ring having a lug thereon, said U-shapel elements each terminating to provide hooks one on either side of the lug for the purpose described.

3. Means for connecting the adjacent ends of a plurality of cross chains of an anti-skid device together, said means comprising a ring having lugs formed at diametrically opposite points and extending parallel to the axis of the ring and having a groove lying in the same plane as the body of the ring, and a substantially U-shaped element connecting each of said cross chains with one of the portions of the ring having a lug thereon, said U-shaped elements each terminating to provide hooks by turning the ends back upon the body of the element, the distance between the ends of said hooks and the body of the element being greater than the thickness of the ring at the groove and less than its thickness between said grooves, for the purpose described.

In testimony whereof I have affixed my signature.

FORREST C. CARPENTER.